United States Patent [19]
Senese

[11] 3,807,089
[45] Apr. 30, 1974

[54] PLANT TRELLIS SYSTEM AND STAKE SUPPORT THEREFOR

[75] Inventor: Jerome R. Senese, Whittier, Calif.

[73] Assignee: Kaiser Steel Corporation, Oakland, Calif.

[22] Filed: Jan. 19, 1973

[21] Appl. No.: 325,142

Related U.S. Application Data

[63] Continuation-in-part of Ser. No. 205,019, Dec. 6, 1971, abandoned.

[52] U.S. Cl............................ 47/46, 248/221, 256/47
[51] Int. Cl.............................................. A01g 17/06
[58] Field of Search................................... 248/221; 47/44–47; 52/721, 40, 731; 256/47–48; 211/119.01

[56] References Cited
UNITED STATES PATENTS

| 257,370 | 5/1882 | Nellis | 47/45 |
| 3,337,988 | 8/1967 | Burton | 47/46 |
| 3,350,067 | 10/1967 | Coda | 256/48 |
| 3,391,491 | 7/1968 | Daly | 47/46 |
| 3,419,998 | 1/1969 | Burton | 47/46 |
| 3,469,343 | 9/1969 | Johnson et al. | 47/46 |
| 3,690,033 | 9/1972 | Lewis et al. | 47/46 |

FOREIGN PATENTS OR APPLICATIONS

| 18,735 | 6/1881 | Germany |
| 419,717 | 4/1947 | Italy |
| 445,183 | 2/1968 | Switzerland |

Primary Examiner—Robert E. Bagwill

[57] ABSTRACT

Improved plant trellis system and stake supports therefor of simplified maintenance-free construction for supporting grape vine plants and the like in such fashion that the grapes or other fruit can be mechanically harvested in an expeditious fashion without injury to plant or trellis element and wherein fruits are exposed to maximum sunlight during the growing season.

19 Claims, 11 Drawing Figures

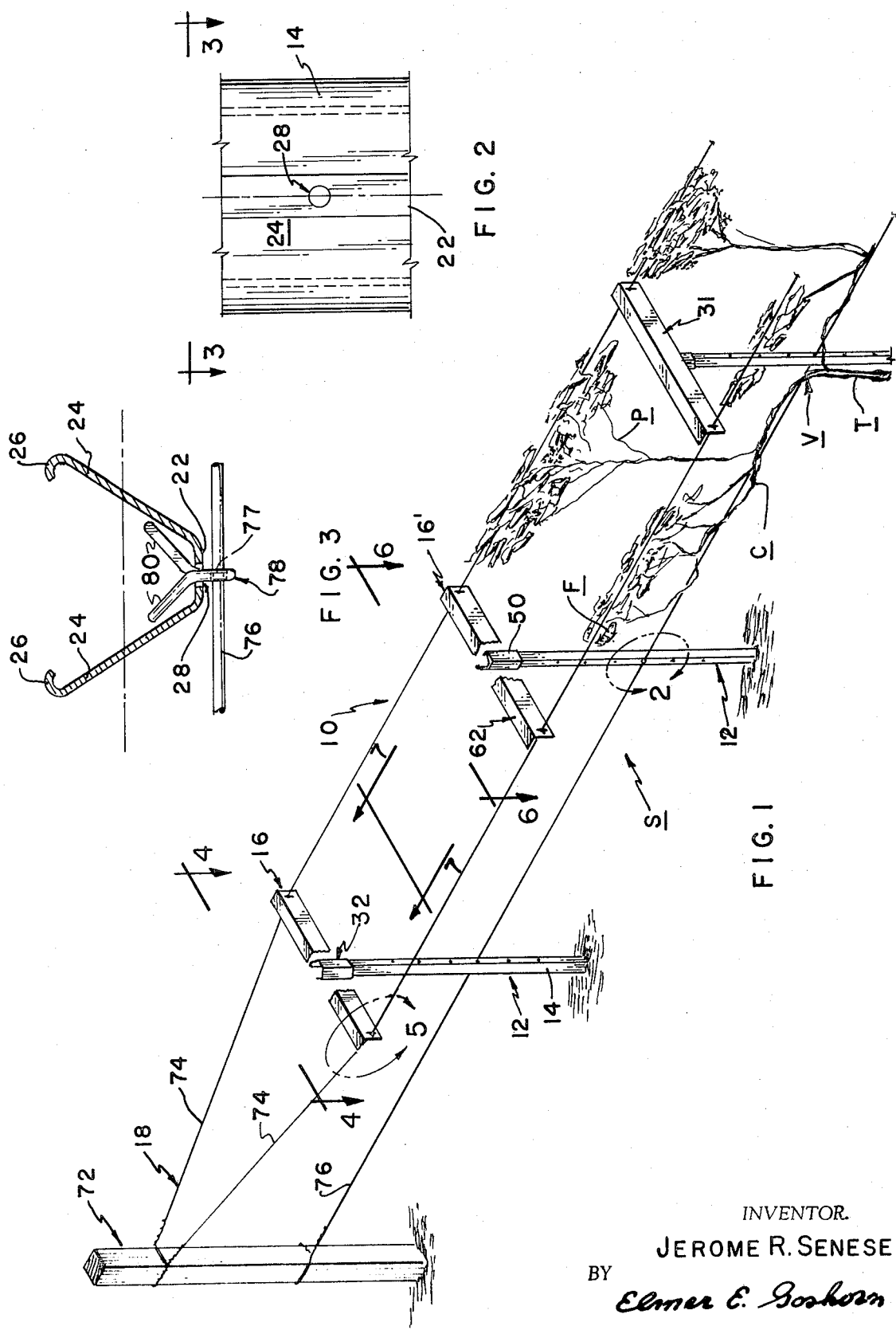

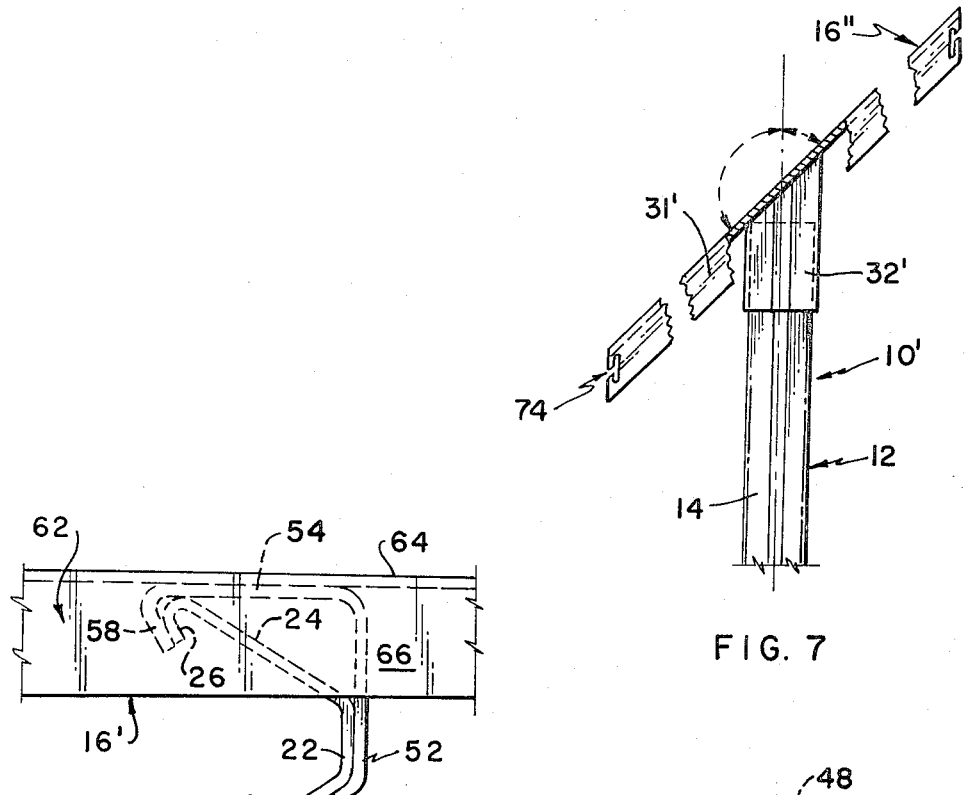
FIG. 7
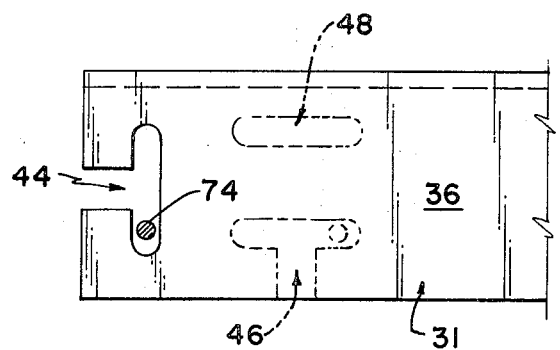
FIG. 6
FIG. 5
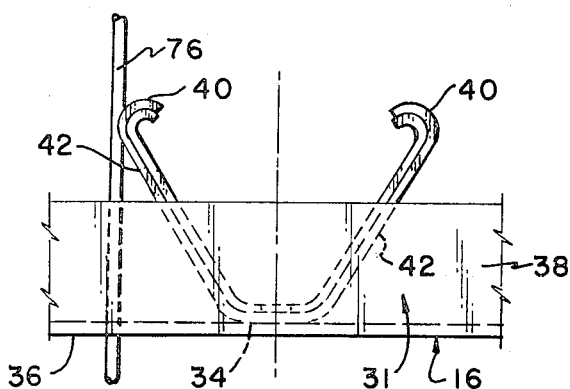
FIG. 4
INVENTOR.
JEROME R. SENESE
ATTORNEY

PATENTED APR 30 1974 3,807,089

PLANT TRELLIS SYSTEM AND STAKE SUPPORT THEREFOR

This application is a continuation-in-part of my abandoned application Ser. No. 205,019, filed Dec. 6, 1971, having the same title.

BACKGROUND OF THE INVENTION

This invention relates to a plant trellis support system. More particularly, it relates to an improved metal plant trellis system for supporting grape plants or the like in such fashion that the grapes or other fruit on a plant can be mechanically harvested in an expeditious fashion without injury to the plants or the trellis elements.

In the past, various plant trellis devices have been designed for supporting one or more plants as exemplified by U.S. Pat. No 397,039 to Terrell et al, granted on Jan. 29, 1889, U.S. Pat. No. 1,250,617 to Montel, granted on Dec. 18, 1917, U.S. Pat. No. 2,227,553 to Paque, granted on Jan. 7, 1941, U.S. Pat. No. 2,712,917 to Flora et al; granted on July 12, 1955 and U.S. Pat. No. 3,606,741 to Olmo et al; granted on Sept. 1, 1971 and a publication entitled "Growing American Bunch Grapes" by U.S. Department of Agricultural Farmers Bulletin No. 2123, published 1968 by the U.S. Government Printing Office. However, these plant trellis supports were not always of simplified rigid construction, or easy to maintain or of such a design that mechanical harvesting methods could be utilized therewith.

The present plant trellis system and the support elements thereof are expecially adapted to support grape vines and the like so that the grapes can be readily harvested by mechanical pickers without injury to the plants or the trellis elements and the grape plant foliage exposed in the fullest fashion to the sunlight during the growing season. The individual stake supports comprise elongated posts of generally arcuate cross-section fitted with a generally T-shaped top cap. Openings are provided in both the T-shaped caps and the posts to facilitate threading of wire to directly support the grape plants.

SUMMARY OF THE INVENTION

It is a primary purpose of the instant invention to provide an improved plant trellis support system made up of improved stake elements or grape stake. The individual stake elements are preferably made from a suitable grade of steel that has been covered with an appropriate corrosion-resistant coating so as to be rugged and capable of withstanding considerable abuse in the field. Each stake element or grape stake includes an elongated metal post of generally arcuate cross-section, as more fully defined hereafter, that is driven into the ground, and a T-shaped cap fitted to the top of the post. The T-shaped cap is advantageously provided with a flange element that is in abutting engagement with, or otherwise fastened to, the top of the post and directly supports the cap on the post. The stake elements are arranged in suitably spaced rows in a vineyard in accordance with the normal grape vine planting practices. Grape plants are trained about wires extending along the rows and carried by the cross arms of the T-shaped cap and anchored to the posts of the stake elements. In an embodiment of the invention as it pertains to the trellis system, a group of three wires can be used for each row of plants. The wire may be arranged in triangular fashion with the lower wire affixed to selected posts in a row and the upper two wires are attached to a cross arm of the post cap of the stake element. These upper wires are adapted to support the outer ends of the plant canes when the vines are fully grown and during the harvesting season. Because of their arrangement these upper wires hold the canes outwardly of and away from the plant root system so that a mechanical harvester when it moves down the aisles between the rows of plants can mechanically shake and/or pick the grapes without contacting or disturbing the root system or otherwise injuring the tender plants. The lower wire is adapted to statically support and hold the cordons of the individual plants throughout their growth.

If desired, in order to maximize the sunlight exposure of a plant the cross arm of a cap can slope in an upward and outward direction.

BRIEF DESCRIPTION OF THE DRAWINGS

FIG. 1 is a fragmentary perspective view of a plant trellis support system of the instant invention, with certain parts broken away;

FIG. 2 is an enlarged segmented and elevational view of one form post for a grape stake and is taken within the bounds of circumscribing line 2 of FIG. 1;

FIG. 3 is a view of the stake post segment of FIG. 2 with parts added and as taken along line 3—3 of FIG. 2;

FIG. 4 is an enlarged top plan view of a stake cross arm with parts added and with other parts broken away as generally viewed along line 4—4 of FIG. 1;

FIG. 5 is an enlarged end view of a stake cross arm taken within the limits of encompassing line 5 in FIG. 1;

FIG. 6 is an enlarged fragmentary top plan view of another cap with parts added and with certain parts broken away as generally viewed along line 6—6 of FIG. 1;

FIG. 7 is an enlarged fragmentary front view of a stake and illustrates in solid lines another slightly modified form of the stake of the present invention diagrammatically shown in FIG. 1 and when taken along line 7—7 of FIG. 1;

With further reference to the drawings FIGS. 1–6 illustrate a useful embodiment of a plant trellis support system 10 of simplified and heavy steel construction and made up of a series of generally overall T-shaped grape stake or support elements 12.

Figure 8:
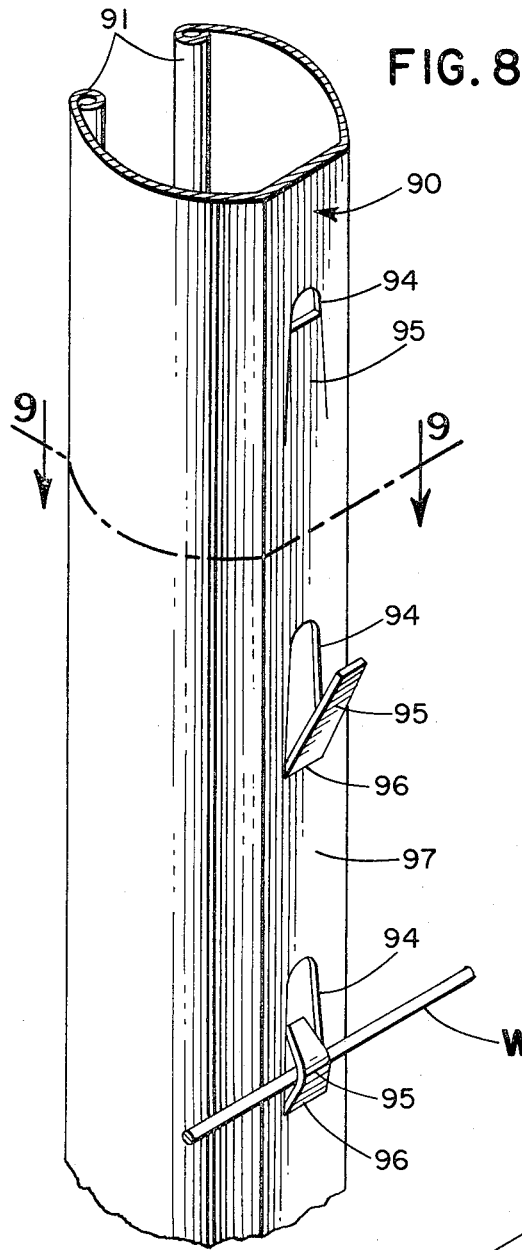
FIG. 8 is a perspective view of a modified form of post for the grape stake of the invention, which also includes an alternate type of wire fastening or anchoring means.

Each stake element is made up of a V-shaped elongated post 14 and a T-shaped cap 16 or 16'. The trellis system further comprises a tensionable wire system 18 made up of spaced parallel wires that extend along a plant row between and may be fastened to grape stakes 12. The lower wires of the system may be connected to posts 14 of the stakes 12 and for supporting opposed bilateral cordons C of a vine V on either side of a given stake post 14, or any other part of the vine adjacent to it and requiring support. The upper wires in the system are disposed above and to either side of the lower wire and are adapted to be connected to the cross arms on the caps 16 or 16' of the grape stake. The upper wires generally support the fruit producing and foliage covered canes P outwardly of the main stake body as the canes grow from a cordon C and extend between the upper and lower trellis wires. Other embodiments of trellis system 10' and the grape stake are illustrated in FIGS. 7–10, inclusive.

As indicated in FIGS. 1–4 a post 14 is comprised of a web portion 22 and opposed outwardly diverging legs 24. The outer free edge of either leg 24 is provided with an inwardly bent reinforcing flange or metal fold, the transverse section of which is shown in FIGS. 3–4. Web portion 22 desirably includes a series of longitudinally aligned openings 28. The lower end of a post 14 is normally driven into the earth S until the lower end of the post is securely anchored in the soil and is located in the area where a vine is to be planted or at the base of the trunk T of a previously planted and growing plant or vine V as indicated in FIG. 1. The posts 14 are spaced in rows in accordance with the standard vineyard planting practices. They may be installed so that their webs face in any desired direction, but conveniently are approximately 90° relative to the direction of the wire along the row so as to facilitate connection of the wire in any desired arrangement, as shown in 18. The wire may be fastened to alternate stakes or to all stakes in a row of the system.

In this form of the invention the T-shaped cap 16 attached to the upper end of the post 14 is comprised of an L-shaped cross bar 31 and a V-shaped stem 32. The web portion 34 of stem 32 can be affixed such as by welding to a section of the back surface of the downwardly or vertically disposed leg 36 of cross bar 31 when the upper edge of stem 32 abuts an intermediate part of the underneath surface of the horizontal or upper leg 38 of cross bar 16 as illustrated in FIG. 4. The V-shaped stem of a cap 16 is somewhat larger in cross sectional dimension than the V-shaped post. This means that the inner surfaces of the opposed arcuate flanges 40, opposed stem legs 42, and web 34 frictionally fit over the outer surface of flanges 26, legs 24 and web 22 of post 14 at the upper end thereof when a cap 16 is slidably attached to the top of the post. The upper leg 38 of a cross arm 16 in abutting the top of a post 14, when the cap stem 32 is connected to the top of the post, advantageously serves to support as well as to precisely position the cross arm 31 at the top of a stake post 14.

Stem 32 is of a length normally much shorter than the length of a post 14, but its length should be such as to assure retention of the cap to a stake under normal installation conditions. The length of a cross bar 31 should be such as to secure the desired and adequate lateral spacing and support of the upper wires of the system 18. Ample spacing is important when the cane or branch portions P of a vine V are wrapped about the upper wires during harvesting operations.

The outer edge portion at either end of the lower leg 36 of the cross arm of a cap 16 is partially cut away so as to define a T-shaped opening 44 or the like as shown in FIG. 5. If desired, the bottom side edge of lower leg 36 can be partially cut away to define a T-shaped opening 46 or an intermediate part of the leg may be cut away so as to define a closed-end elongated slot 48.

The T-shaped openings 44, 46 or slot 48 in cross arm 16 have a width sufficient to accommodate the wire to be inserted or threaded through the slot 44, 46, or 48. Lower leg 36 of a cross bar 31 usually has a width somewhat greater than the width of upper leg 38 of the cross bar in order that opposite ends of the lower leg 36 of a given cross bar 31 can be provided with opposed openings 44, 46 or 48 as the case may be in suitable fashion during manufacture or a given cross bar 31.

The modified cap 16' of a post 14 of a system 10 is generally made up of a stem portion 50 that is roll formed into a C-shaped configuration in transverse section. The C-shaped stem is comprised of a web 52, a leg 54 connected at a right angle to one edge of the web 52 and another leg 56 connected to the opposite edge thereof. The other leg extends downwardly and outwardly from web 52. For reasons that will become more apparent hereinafter the free edge of leg 54 is provided with an inwardly bent or folded flange 58 while a turned-in flange 60 is carried by the free edge of leg 56. These folds reinforce and strengthen stake 14 and also provide smooth edges to facilitate handling.

In one form opposed inner surfaces of opposed legs 54 and 56 of stem 50 are spaced at a maximum distance from each other in the area of opposed flanges 58 and 60. The maximum distance between opposed inner surfaces of opposed legs 54 and 56 may be somewhat less than the maximum distance between the outer ends of opposed legs 24 of a post 14 in the area of post flanges 26. The outer surface of flange 60 and certain outer surface portions of flange 58 may lie in a common plane that is generally parallel to the plane of web 52. The shortest distance between the inner surface of flange 60 and the inner surface of web 52 may be somewhat less than the shortest distance between the outer surface of post web 22 and an outer surface portion of a post flange 26. By this form the slidable connection of stem 52 to the upper end of post 14 certain inner surfaces of the stem flanges 58 and 60, legs 54 and 56 and web 52 are tightly fitted in overlapping frictional engagement with the outer surfaces of opposed post flanges 26, opposed legs 24 and web 22 when assembled in the manner shown in FIGS. 1 and 6. Since stem flange 58 of a cap 16 is bent more inwardly than its associated flange 26 of a post 14 the stem 50 of cap 16 will be held in tight frictional engagement with the upper end of its associated post 14' throughout use of system 10 such as, for instance, when the upper wires of system 18 and in turn a stake 12 of system 10 are vibrated or shaken during mechanical harvesting of fruit from the vines as supported by system 10.

The tight frictional engagement discussed above is not essential to the satisfactory performance of the grape stake of the invention. Indeed in some applications there can be definite advantages in a relatively loose and slidable fit of the cross arm on the post, particularly where speed and ease of assembly and disassembly are important.

Cap 16' of a system 10 includes an L-shaped cross arm 62 of a shape similar to cross arm 31 of a cap 16. An intermediate surface portion of the inside surface of the vertical leg section 64 of leg 62 is tack welded or otherwise affixed to the exposed surface of leg 54 of an associated stem 50 of a given cap 16'. An underneath intermediate surface portion of the horizontally disposed leg 66 of L-shaped cross arm 62 abuts the top edge of the associated C-shaped stem 50 when the leg 54 of stem 50 is affixed to the back side of the vertical leg 64 of a cross arm 62 as shown in FIGS. 1 and 6.

As with cap cross arm 31 opposite ends of the vertical leg 64 of a cross arm 62 are provided with opposed openings for freely receiving upper wires of system 18 as indicated in FIGS. 1 and 5. Stem 50 of a cap 16' normally has a length corresponding to the length of stem 32 of a cap 16.

Wire arrangement 18 may be comprised of a series of wires, and in one arrangement includes three parallel spaced wires 74, 74 and 76 anchored at their extremities to row end posts 72 when the three wires are connected at intermediate points to stakes 12. Upper wires 74 are normally threaded through slot 44 of stake cross arms 31 and 62 in the manner depicted in FIGS. 1 and 5. The lower wire 76 is connected to certain stakes 14 in serveral ways. In one arrangement a Cotter pin 78 is provided for interconnecting the lower wire 76 to opening 28 in post 14 all as illustrated in FIGS. 1 and 3. The opening at the head 77 of a Cotter pin 78 is adapted to freely receive the lower wire upon insertion of the lower wire through the opening in pin head 77. The opposed leg ends of a pin 78 after the head of the pin is connected to lower wire 76 are inserted through an intermediate opening 28 of post 14 thereby interconnecting the lower wire to the post. Upon connecting a pin and lower wire 76 to a post 14, the pin can be locked to the post upon bending the outer ends of opposed legs 80 of the pin in opposite and outward directions in the usual fashion and as shown in FIG. 3. After attachment of the wires to the stakes 12 the ends of the wires are drawn up and tensioned as desired about end posts 72.

Another embodiment of system 10' is comprised of a cap 16" having an upward and outwardly sloping L-shaped cross arm 31' as indicated in FIG. 7. The upper end of a stem 32' is beveled in the same fashion as the intended slope of the cross arm as shown in FIG. 7. The upper beveled end of stem 32' is affixed to cross arm 31' in the same manner as stem 32 is affixed to cross arm 31 as aforedescribed. A suitable angle between a sloped cross arm 31' and stem 32' has been found to be on the order of 135°. The upper end of C-shaped stem 50 may also be beveled in the same fashion as the upper end of stem 32' whereby cross arm 62 will have the same slope as cross arm 31' when cross arm 62 is affixed to the upper beveled end of stem 50.

By reason of the upward and outward slope of the cross arm 31' or 62 of a cap 16" or 16' the upper wire 74 at one end of the cross arm 31' or 62 is disposed at a higher elevation than the other upper wire 74 at the opposite end thereof as depicted in FIG. 7. This difference in elevation between opposed upper wires of a sloped cross arm system 10' enables the leaves of the canes of a plant to be exposed to greater amounts of sunlight than would be the case for the horizontal cross arm system 10 of FIG. 1 and without at the same time presenting a serious obstruction to mechanical harvesters (not shown) that move up and down the rows of vines during harvest time.

Figure 9:
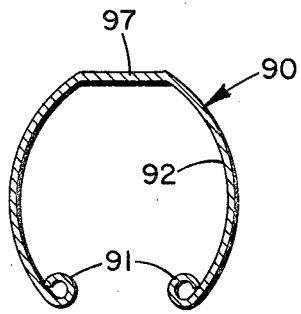
FIG. 9 is a cross-section of the post of FIG. 8 taken along the line 9—9 thereof.

Although the specific embodiment of the grape stake of the invention heretofore discussed is a post of a V-shaped cross section, it is to be understood that any post of generally arcuate cross section is comprehended as within the scope of the invention so long as it combines sufficient strength to resist bending and torsional stresses and strains while it is not of such a heavy gauge as to be cumbersome and unwieldy for handling by a worker or for driving into the ground. Therefore, the term "generally arcuate cross-section" as used herein, means a C-shaped, oval-shaped, U-shaped, or even L-shaped post or stake or the like, as well as the V-shaped post. In the preferred embodiment it is intended that the long edges of the metal piece forming the post be folded back, or flanged, as shown in the drawings wherein FIGS. 3 and 9 are typical. These end folds or flanges reinforce and strengthen the post to a considerably greater extend than a continuous pipe or post of generally arcuate cross-sections of the same thickness or gauge not having such reinforcing features. The flange also readily provides a smooth edge to enable a worker to avoid cuts and gouges in handling.

Figure 9A:
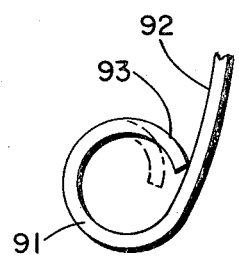
FIG. 9A is a detail of one form of post edge.

FIGS. 8 and 9 are illustrative of an advantageous embodiment of the invention wherein an elongated galvanized steel post 90 is of a U-shaped or oval cross-section. The long edges 91 of post 90 provide the reinforcing and strengthening effect heretofore discussed. In a useful embodiment of this invention, the folds are extended so that the longitudinal edges are back of inside wall 92 of post 90 and, in effect, constitute a tube 93, which resists expansion by rubbing against inside wall 92 as shown in FIG. 9A, and thus increases the strengthening effect of the folds 91.

Post 90 is provided with a series of partially punched out openings 94 and prepunched tabs 95 that initially partially fill and lie flat within these openings, with the openings and tabs being suitably spaced along the length of the post, e.g., 6 inches on center. Openings 94 are shown in FIG. 8 as tapered and somewhat triangular in shape, but can be of any suitable design. In the form depicted approximately one-fourth of opening 94 is completely cut out and about three-fourths thereof is occupied by tab 95, which is cut away from post 90.

Openings 94 provide convenient access for simple hand tools and the like to facilitate bending tab 95 as required for fastening wire W, an example of which is illustrated in FIG. 8. In use, tab 95 is bent outwardly about its base 96 for receipt of a trellis wire W. After insertion of wire W, tab 95 is bent inwardly toward opening 90. Wire W, when so fastened is well able to withstand the oscillations and forces resulting from a mechanical harvester.

In advantageous embodiments of the invention Wire W has a diameter ranging within 0.075 to 0.140 inch (10 to 14 gauge), tabs 95 have a height of about 182 of the greatest overall height of openings 94, and the elongated posts are of steel ranging from about 16 to about 20 gauge.

Although openings 94 with associated tab 95 as illustrated in FIG. 8 in connection with a U-shaped or somewhat oval-shaped post, it is to be understood that this type of struck out tab, which is adapted to enclose the wire to be crimped back through the opening from which it is struck, is intended for use on any post of the varied shape of generally arcuate cross-section heretofore described as useful with this invention. Excellent results are obtained when the area of the elongated post, which in he case of FIG. 8 is post 90, has a flat web portion 97 from which the tabs are struck. Web 97 reduces the risk of tearing the tabs at their base, such as might be encountered if the tabs are struck from an angle as at the apex of a V-shaped post, or within the rounded wall of a U-shaped post.

Figure 10:
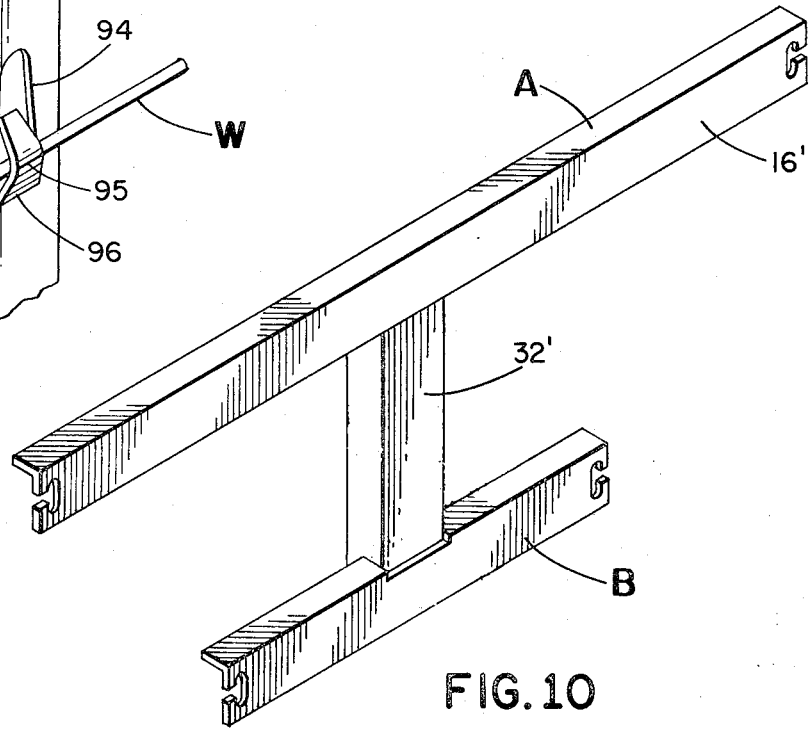
FIG. 10 is a fragmentary perspective view of a modified crossarm arrangement for the grape stake of this invention.

In another form of the invention, the post cap which is slidably fitted on to the post as illustrated in FIGS. 1 and 7, can include more than one cross arm, as shown in FIG. 10. Accordingly, the term "generally T-shaped cross arm" as used herein is intended to include cross arm arrangements wherein more than one cross bar may be used. One such embodiment includes a cap assembly 16' that comprises two cross bars A and B. The top cross bar A and stem 32' are assembled in the manner contemplated by the cross arm arrangement of FIG. 6 wherein a second cross arm B is attached to the base of stem 32' by welding or any other suitable manner. Each such cross bar A and B can be of a length that extends to a distance greater, lesser, or the same as the other cross bar of the post cap 16' and desirably has openings at the ends or intermediate thereof to receive wires, all as more fully illustrated in FIG. 10.

As previously discussed, the fit of the cross arm on the post is always a slidable arrangement. In many instances it is sufficient and preferred that it be a relatively loose fit to facilitate ready removal of the post cap as conditions along a plant row vary with the condition of the vine and the like, and to enable interfitting of modified types of cross bars. Under other circumstances where more permanent fittings are required, the slidable arrangement can be modified so that the cross arm and the post are frictionally engaged or otherwise affixed to provide a grape stake assembly wherein the cross arm and post are, for all practical purposes, permanently connected.

The instant support system and grape stakes are quite flexible in that stakeposts 14 can be intially erected without first being capped during the initial growth period of a grape plant. As the plants continue to grow the caps 16 or a6' are applied as needed along with wires in wire system 18 in the vineyard.

During continued growth of a plant V with respect to its post 14 opposed cordons C of a vine V are trained along and supported by opposed portions of lower wire 76 as disposed on opposite sides of the post associated with the vine. The cordons C are normally affixed to their associated opposed portions of lower wire 78 by tie wires (not shown) in the manner illustrated in FIG. 1. After anchoring of the opposed cordons C of a plant V adjacent a post 14 the outer ends of shoots P of a plant can be eventually trained along adjacent portions of an upper wire 74 disposed an opposite sides of a stake cross arm 31 or 62 in order for the foliage at the outer ends of the shoots to have maximum exposure to sunlight. At the same time the grape bunches F on fruit bearing shoots P along an upper wire 74 are effectively shaded from the sunlight as the sun moves across the horizon. The lower ends of a given shoot P extend between upper and lower wires 74 and 76 on either side of a trellis 10 whereby the new and fruit bearing shoots P of a given plant V can be appropriately trained in opposed double curtain-like fashion on opposite sides of a trellis 10 along its length as indicated in FIG. 1.

Since an upper wire 74 is inserted in the opening of a cross arm 31 or 62 and depending upon the particular shape of a cross arm opening 44, 46 or 48 a tensioned upper wire 74 can be vibrated up and down, back and forth or any combination thereof during operation of a mechanical harvester (not shown) adjacent the vines without the wires becoming disengaged from the cross arms, which disengagement of course could otherwise seriously interfere with the harvesting operation. Such vibration of the canes P of a plant V causes progressive continuous separation of sufficiently all grape bunches F of a vine V from its shoots P. The separated grapes fall under the influence of gravity onto a mechanical harvester conveyor (not shown) and disposed beneath the upper wire 74 of a system 10 on either side thereof. Because the instant trellis system 10 effectively supports a plurality of plants V intermediate its ends and outwardly of the main posts throughout the vibration of any given plant during harvesting and because the grape bunches F as harvested from the vines V are immediately captured by a harvester conveyor (not shown) the possibility of injury to the fruit being harvested and/or the supporting stake elements is nil.

By reason of the trellis being made of steel the joints between the cap and post of a given stake 12 or 12" are maintained despite various loadings thereon such as the trellis being subjected to frequent vibrations of a mechanical harvesting machine (not shown). Since the metal cap and the metal post of a stake normally maintain their dimensions the cap and post of a given stake can be interchangeably used with a post and cap of another stake.

Because a post 14 of system 10 is of roll formed flanged construction, the possibility of injury to the user, such as a deep laceration of the user's arm upon handling or use of the post at a given site S, is greatly minimized. The design of the flanged posts 14 also minimizes the possibility of injury to or contact with a typical mechanical grape harvester device's fruit harvesting finger as this finger moves along a trellis 10 during harvesting of fruit from the trellised fruit bearing shoots P of a vine V.

Although the instant trellis system and grape stake are disclosed for use in conditions grapes and like fruit bearing plants, they could also be used for supporting other types of plants such as bougainvillea. The wire system can have three or any number of wires depending on the type of plant being supported by the system.

Various advantageous embodiments of the coupling band device have been shown and described and modifications can be made therein without departing from the inventive concepts set forth herein, wherein:

What is claimed is:

1. A plant trellis system comprising a plurality of selectively oriented support stakes at least certain ones of which comprise an elongated upright post of generally arcuate cross-section which is adapted to be driven into the earth, a generally T-shaped post cap provided with a stem that is slidably fitted about the upper end of the post and a cross bar connected to said stem, said cross bar having a flange element that abuts the top of the post and supports the cross bar on the post, said cross bar also having at least one opening for receiving and retaining a wire-like element about which a plant can be trained.

2. A plant trellis system as set forth in claim 1, including a wire-like element fitted within the said opening in the cross bar.

3. A plant trellis system as set forth in claim 1 in which said elongated post and the stem of said post cap are V-shaped in cross-section.

4. A plant trellis system as set forth in claim 1 in which said elongated post and the stem of said post cap are C-shaped in cross-section.

5. A plant trellis system as set forth in claim 1 in which said elongated post and the stem of said post cap are U-shaped in cross-section.

6. A plant trellis system as set forth in claim 1 in which said post is provided with means for anchoring a wire thereto.

7. A plant trellis system as set forth in claim 1 in which said cross bar is connected to said stem at angles that are greater and lesser than 90°.

8. A trellis system plant stake comprising an elongated post of generally arcuate cross-section which is adapted to be driven into the earth and a generally T-shaped post cap provided with a stem that is slidably fitted about the upper end of said post and at least one cross-bar connected to said stem, said cross bar being provided with a flange element that abuts the top of the post and supports the cross bar on said post when the post cap is slidably affixed to the post, said cross bar having at least one slotted opening adapted to receive and retain a wire-like element about which selected portions of a plant are to be trained.

9. A plant stake as set forth in claim 8 in which said elongated post is V-shaped in cross-section.

10. A plant stake as set forth in claim 9 in which the body of the post is apertured and further comprises pin means interconnecting said post to a wire-like element, said pin means being inserted into and through said aperture in said post.

11. A plant stake as set forth in claim 9 in which said post cap cross bar is connected to the post cap stem at other than a right angle.

12. A plant stake as set forth in claim 8 in which said post cap stem is C-shaped in cross-section.

13. A plant stake as set forth in claim 8 in which said elongated post is U-shaped in cross-section.

14. A plant stake as set forth in claim 8 in which said post cap is also fitted in tight frictional engagement with said post.

15. A plant stake as set forth in claim 8 in which said elongated post has struck out tabular means adapted to bend outwardly to accommodate a wire and thereafter to be bent inwardly for fastening said wire thereto.

16. A plant stake assembly as set forth in claim 15 wherein said struck out tabular means are positioned on a flat web portion along the length of said post.

17. A plant stake assembly as set forth in claim 8 in which said post cap is comprised of an upper and lower cross arm and a post cap stem to which each of said cross arms are attached.

18. A grape stake assembly as set forth in claim 8, wherein the longitudinal edges of said generally arcuate elongated post are folded over to strengthen said post.

19. A grape stake assembly as set forth in claim 18 wherein said folded edges are of sufficient area and are bent to an extent that said edges form a rigid strengthening tube.

* * * * *